(12) United States Patent
Shim

(10) Patent No.: US 7,674,200 B2
(45) Date of Patent: Mar. 9, 2010

(54) POWER TRAIN OF AUTOMATIC TRANSMISSION

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 418 days.

(21) Appl. No.: 11/789,790

(22) Filed: Apr. 25, 2007

(65) Prior Publication Data

US 2008/0146392 A1 Jun. 19, 2008

(30) Foreign Application Priority Data

Dec. 13, 2006 (KR) .................. 10-2006-0127419

(51) Int. Cl.
*F16H 3/44* (2006.01)
(52) U.S. Cl. .................. 475/281; 475/276; 475/329; 475/330
(58) Field of Classification Search .................. None
See application file for complete search history.

(56) References Cited

U.S. PATENT DOCUMENTS 3,971,268 A * 7/1976 Murakami et al. .......... 475/276

2008/0188344 A1 * 8/2008 Raghavan et al. .......... 475/276

* cited by examiner

*Primary Examiner*—David D Le
*Assistant Examiner*—Justin Holmes
(74) *Attorney, Agent, or Firm*—Morgan, Lewis & Bockius LLP

(57) ABSTRACT

A power train for eight forward and one reverse speeds may include input shaft, output gear, transmission case, speed shift unit, output unit, four clutches and two brakes. The speed shift unit includes a first operational member fixedly connected to the input shaft, a second operational member selectively coupled to the input shaft; a third operational member fixedly connected to the transmission case; a fourth operational member selectively coupled to the sixth operation member; and a fifth operational member selectively coupled to the fourth operational member. The output unit includes a sixth operational member fixedly connected to the fifth operational member, a seventh operational member selectively coupled to the input shaft and the transmission case, an eighth operational member selectively coupled to the input shaft, and a ninth operational member connecting the output gear. The four clutches and two brakes control pertinent operation members to change the rotational speed.

22 Claims, 12 Drawing Sheets

FIG.4

| shift speed | C1 | C2 | C3 | C4 | B1 | B2 | F1 | shift ratio | step ratio of shift ratio |
|---|---|---|---|---|---|---|---|---|---|
| D1 | ● | | | | ○ | | ● | 4.12 | |
| D2 | ● | ● | | | | | | 2.60 | 1.59 |
| D3 | ● | | | | | ● | | 1.78 | 1.46 |
| D4 | ● | | ● | | | | | 1.28 | 1.39 |
| D5 | ● | | | ● | | | | 1.00 | 1.28 |
| D6 | | | ● | ● | | | | 0.86 | 1.17 |
| D7 | | | | ● | | ● | | 0.75 | 1.14 |
| D8 | | ● | | ● | | | | 0.68 | 1.10 |
| REV.1 | | | ● | | ● | | | −6.00 | 6.05 |

| shift speed | C1 | C2 | C3 | C4 | B1 | B2 | F1 | shift ratio | step ratio of shift ratio |
|---|---|---|---|---|---|---|---|---|---|
| D1 | ● | | | | ○ | | ● | 4.20 | |
| D2 | ● | ● | | | | | | 2.66 | 1.58 |
| D3 | ● | | | | | ● | | 1.80 | 1.48 |
| D4 | ● | | ● | | | | | 1.31 | 1.37 |
| D5 | ● | | | ● | | | | 1.00 | 1.31 |
| D6 | | | ● | ● | | | | 0.85 | 1.18 |
| D7 | | ● | | ● | | ● | | 0.75 | 1.13 |
| D8 | | | ● | ● | | | | 0.68 | 1.10 |
| REV.1 | | | ● | | ● | | | −6.41 | 6.17 |

| shift speed | C1 | C2 | C3 | C4 | B1 | B2 | F1 | shift ratio | step ratio of shift ratio |
|---|---|---|---|---|---|---|---|---|---|
| D1 | ● | | | | ○ | | ● | 4.24 | |
| D2 | ● | ● | | | | | | 2.57 | 1.65 |
| D3 | ● | | | | | ● | | 1.76 | 1.45 |
| D4 | ● | | ● | | | | | 1.25 | 1.41 |
| D5 | ● | | | ● | | | | 1.00 | 1.25 |
| D6 | | | ● | ● | | | | 0.87 | 1.14 |
| D7 | | | | ● | | ● | | 0.76 | 1.14 |
| D8 | | ● | | ● | | | | 0.70 | 1.10 |
| REV.1 | | | ● | | ● | | | −6.06 | 6.08 |

Zr1/Zs1=1.15, Zr2/Zs2=2.44, Zr3/Zs3=3.24, Zr4/Zs4=3.24

POWER TRAIN OF AUTOMATIC TRANSMISSION

CROSS-REFERENCE TO RELATED APPLICATION

This application claims priority to and the benefit of Korean Patent Application No. 10-2006-0127419 filed in the Korean Intellectual Property Office on Dec. 13, 2006, the entire contents of which are incorporated herein by reference.

BACKGROUND OF THE INVENTION (a) Field of the Invention

The present invention relates to a power train of an automatic transmission, and more particularly, to a power train that realizes eight forward speeds and one reverse speed.

(b) Description of the Related Art

A typical shift mechanism of an automatic transmission utilizes a combination of a plurality of planetary gear sets. A power train of such an automatic transmission that includes a plurality of planetary gear sets changes rotational speed and torque received from a torque converter of the automatic transmission, and accordingly transmits the changed torque to an output shaft.

It is well known that when a transmission realizes a greater number of shift speeds, speed ratios of the transmission can be more optimally designed and therefore a vehicle can have economic fuel mileage and better performance. For that reason, an automatic transmission that is able to realize more shift speeds is under continuous investigation.

In addition, with the same number of speeds, features of a power train such as durability, efficiency in power transmission, and size, depend a lot on the layout of combined planetary gear sets. Therefore, designs for a combining structure of a power train are also under continuous investigation.

A manual transmission that has too many speeds causes the inconvenience of to a driver. Therefore, the advantageous features of automatic transmissions having more shift-speeds are more important because an automatic transmission automatically controls shifting operations.

Meanwhile, as more shift-speeds in an automatic transmission are realized, a power train that shifts skip-up and skip-down easily, as well as shifts up and down normally, is required.

The above information disclosed in this background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power train of an automatic transmission having the advantage of realizing eight forward speeds and one reverse speed.

In addition, the present invention has been made in an effort to provide a power train of an automatic transmission having the further advantage of facilitating a skip up-shifting and a skip down-shifting.

Exemplary power trains of an automatic transmission according to embodiments of the present invention may include an input shaft, an output gear, a transmission case, a speed shift unit, an output unit, a first clutch, a second clutch, a third clutch, a fourth clutch, a first brake, and a second brake. The speed shift unit includes: a first operational member that is fixedly connected to the input shaft; a second operational member that is selectively coupled to the input shaft; a third operational member that is fixedly connected to the transmission case; a fourth operational member that generates a reverse rotational speed by operations of the first and third operational members; and a fifth operational member that is selectively coupled to the fourth operational member and receives the reverse rotational speed from the fourth operational member, or generates a reduced rotational speed by operations of the second and third operational members. The output unit includes: a sixth operational member that is fixedly connected to the fifth operational member, receives the reverse rotational speed from the fourth operational member or the reduced rotational speed from the fifth operational member, and is selectively coupled to the transmission case; a seventh operational member that is selectively coupled to the input shaft and selectively coupled to the transmission case; an eighth operational member that is selectively coupled to the input shaft; and a ninth operational member that always operates as an output member by being fixedly connected to the output gear, wherein the output unit generates eight forward speeds and one reverse speed at the ninth operational member by operations of the sixth, seventh, and eighth operational members. The first clutch selectively couples the eighth operational member to the input shaft, the second clutch selectively couples the fourth operational member to the fifth operational member, the third clutch selectively couples the second operational member to the input shaft, and the fourth clutch selectively couples the seventh operational member to the input shaft. The first brake selectively stops the seventh operational member, and the second brake selectively stops the sixth operational member.

First and second exemplary embodiments of the present invention may include: a first planetary gear set being a single pinion planetary gear set and having a first sun gear, a first planet carrier, and a first ring gear as operational members thereof; and a second planetary gear set being a double pinion planetary gear set and having a second sun gear, a second planet carrier, and a second ring gear as operational members thereof, wherein the first planet carrier is fixedly connected to the second planet carrier, the first sun gear is operated as the first operational member, the second sun gear is operated as the second operational member, at least one of the fixedly connected first planet carrier and second planet carrier is operated as the third operational member, the first ring gear is operated as the fourth operational member, and the second ring gear is operated as the fifth operational member.

The output unit may include: a third planetary gear set being a single pinion planetary gear set and having a third sun gear, a third planet carrier, and a third ring gear as operational members thereof; and a fourth planetary gear set being a single pinion planetary gear set and having a fourth sun gear, a fourth planet carrier, and a fourth ring gear as operational members thereof, wherein the third ring gear is fixedly connected to the fourth planet carrier, the third planet carrier is fixedly connected to the fourth ring gear, the third sun gear is operated as the sixth operational member, at least one of the fixedly connected third planet carrier and fourth ring gear is operated as the seventh operational member, the fourth sun gear is operated as the eighth operational member, and at least one of the fixedly connected third ring gear and fourth planet carrier is operated as the ninth operational member.

The first clutch may be disposed at an opposite side to the speed shift unit with reference to the output unit, the second clutch may be disposed at an opposite side to the output unit with reference to the speed shift unit, and the third clutch may be disposed between the speed shift unit and the output unit.

A one-way clutch, being disposed in parallel with the first brake, may be interposed between the seventh operational member and the transmission case.

The fourth clutch may be disposed between the speed shift unit and the output unit according to the first exemplary embodiment of the present invention, and the fourth clutch may be disposed at an opposite side to the speed shift unit with reference to the output unit according to the second exemplary embodiment of the present invention.

Third and fourth exemplary embodiments of the present invention may include: a first planetary gear set being a single pinion planetary gear set and having a first sun gear, a first planet carrier, and a first ring gear as operational members thereof; and a second planetary gear set being a single pinion planetary gear set and having a second sun gear, a second planet carrier, and a second ring gear as operational members thereof, wherein the first planet carrier is fixedly connected to the second ring gear, the first sun gear is operated as the first operational member, the second sun gear is operated as the second operational member, at least one of the fixedly connected first planet carrier and second ring gear is operated as the third operational member, the first ring gear is operated as the fourth operational member, and the second planet carrier is operated as the fifth operational member.

The output unit may include: a third planetary gear set being a single pinion planetary gear set and having a third sun gear, a third planet carrier, and a third ring gear as operational members thereof; and a fourth planetary gear set being a single pinion planetary gear set and having a fourth sun gear, a fourth planet carrier, and a fourth ring gear as operational members thereof, wherein the third ring gear is fixedly connected to the fourth planet carrier, the third planet carrier is fixedly connected to the fourth ring gear, the third sun gear is operated as the sixth operational member, at least one of the fixedly connected third planet carrier and fourth ring gear is operated as the seventh operational member, the fourth sun gear is operated as the eighth operational member, and at least one of the fixedly connected third ring gear and fourth planet carrier is operated as the ninth operational member.

The first clutch may be disposed at an opposite side to the speed shift unit with reference to the output unit, the second clutch may be disposed at an opposite side to the output unit with reference to the speed shift unit, and the third clutch may be disposed between the speed shift unit and the output unit.

A one-way clutch, being disposed in parallel with the first brake, may be interposed between the seventh operational member and the transmission case.

The fourth clutch may be disposed between the speed shift unit and the output unit according to the third exemplary embodiment of the present invention, and the fourth clutch may be disposed at an opposite side to the speed shift unit with reference to the output unit according to the fourth exemplary embodiment of the present invention.

Fifth and sixth exemplary embodiments of the present invention may include: a first planetary gear set being a single pinion planetary gear set and having a first sun gear, a first planet carrier, and a first ring gear as operational members thereof; and a second planetary gear set being a single pinion planetary gear set and having a second sun gear, a second planet carrier, and a second ring gear as operational members thereof, wherein the first sun gear is fixedly connected to the second planet carrier, the second sun gear is operated as the first operational member, the first ring gear is operated as the second operational member, at least one of the fixedly connected first sun gear and second planet carrier is operated as the third operational member, the second ring gear is operated as the fourth operational member, and the first planet carrier is operated as the fifth operational member.

The output unit may include: a third planetary gear set being a single pinion planetary gear set and having a third sun gear, a third planet carrier, and a third ring gear as operational members thereof; and a fourth planetary gear set being a single pinion planetary gear set and having a fourth sun gear, a fourth planet carrier, and a fourth ring gear as operational members thereof, wherein the third ring gear is fixedly connected to the fourth planet carrier, the third planet carrier is fixedly connected to the fourth ring gear, the third sun gear is operated as the sixth operational member, at least one of the fixedly connected third planet carrier and fourth ring gear is operated as the seventh operational member, the fourth sun gear is operated as the eighth operational member, and at least one of the fixedly connected third ring gear and fourth planet carrier is operated as the ninth operational member.

The first clutch may be disposed at an opposite side to the speed shift unit with reference to the output unit, the second clutch may be disposed at an opposite side to the output unit and between the first planetary gear set and the second planetary gear set of the speed shift unit, and the third clutch may be disposed between the speed shift unit and the output unit.

A one-way clutch, being disposed in parallel with the first brake, may be interposed between the seventh operational member and the transmission case.

The fourth clutch may be disposed between the speed shift unit and the output unit according to the fifth exemplary embodiment of the present invention, and the fourth clutch may be disposed at an opposite side to the speed shift unit with reference to the output unit according to the sixth exemplary embodiment of the present invention.

According to exemplary embodiments of the present invention, the first clutch and the first brake are applied in a first forward speed, the first and second clutches are applied in a second forward speed, the first clutch and the second brake are applied in a third forward speed, the first and third clutches are applied in a fourth forward speed, the first and fourth clutches are applied in a fifth forward speed, the third and fourth clutches are applied in a sixth forward speed, the fourth clutch and the second brake are applied in a seventh forward speed, the second and fourth clutches are applied in an eighth forward speed, and the third clutch and the first brake are applied in a reverse speed.

BRIEF DESCRIPTION OF THE DRAWINGS

FIG. 4 is an operational chart for a power train of an automatic transmission that realizes eight forward speeds and one reverse speed according to the first and second exemplary embodiments of the present invention.

FIG. 8 is an operational chart for a power train of an automatic transmission that realizes eight forward speeds and one reverse, speed according to the third and fourth exemplary embodiments of the present invention.

FIG. 12 is an operational chart for a power train of an automatic transmission that realizes eight forward speeds and one reverse speed according to the fifth and sixth exemplary embodiments of the present invention.

DETAILED DESCRIPTION OF THE EMBODIMENTS

Exemplary embodiments of the present invention will hereinafter be described in detail with reference to the accompanying drawings.

Figure 1:
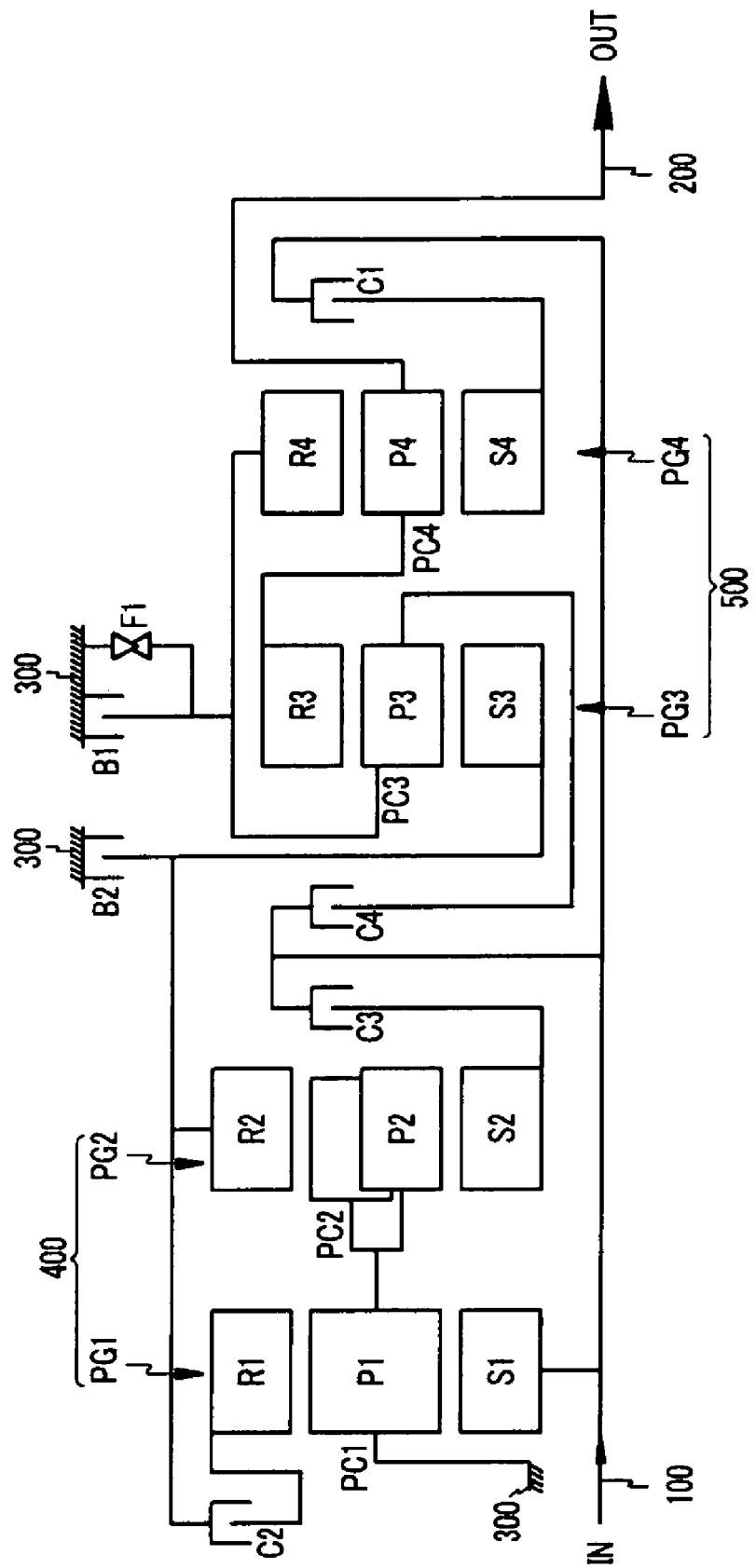
FIG. 1 is a schematic diagram of a power train of an automatic transmission according to the first exemplary embodiment of the present invention.
Figure 2:
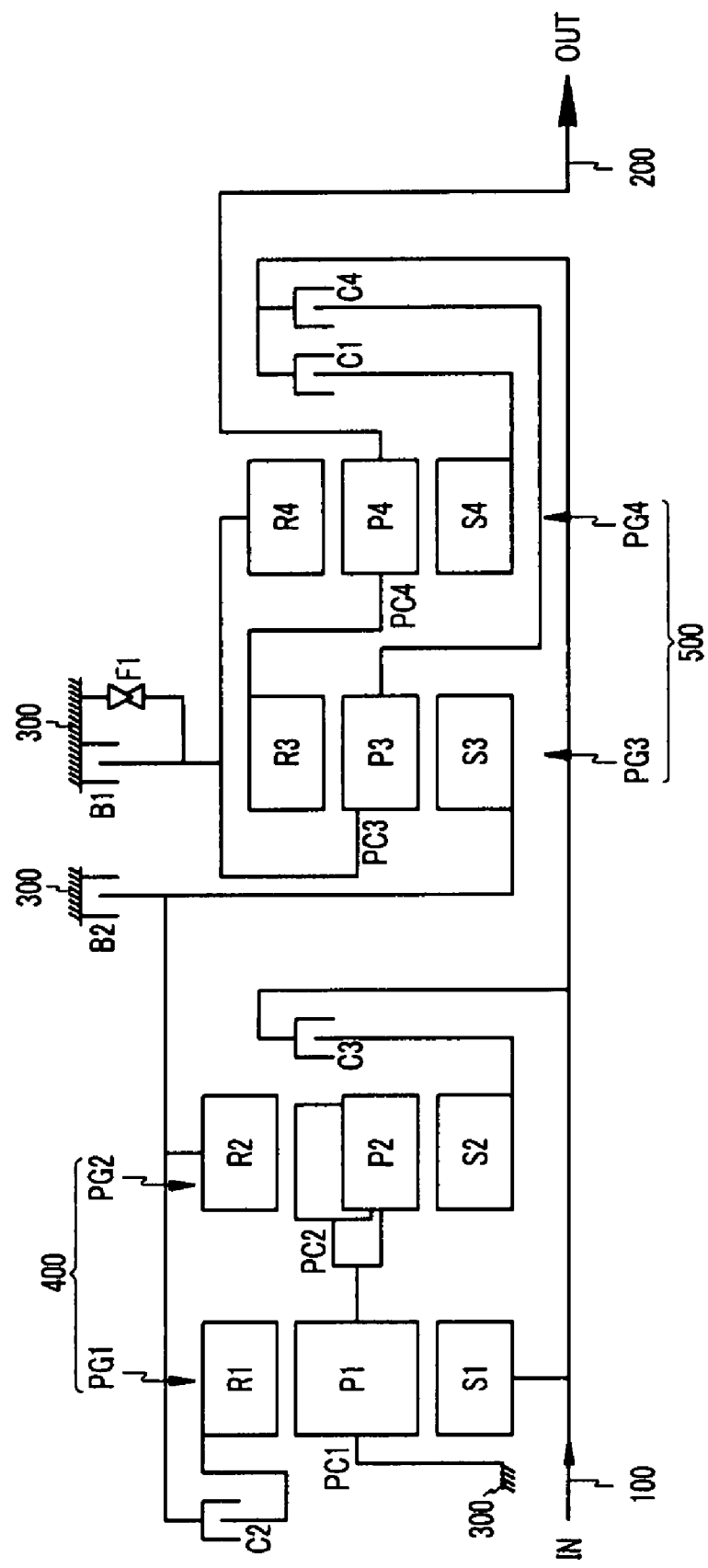
FIG. 2 is a schematic diagram of a power train of an automatic transmission according to the second exemplary embodiment of the present invention.
Figure 5:
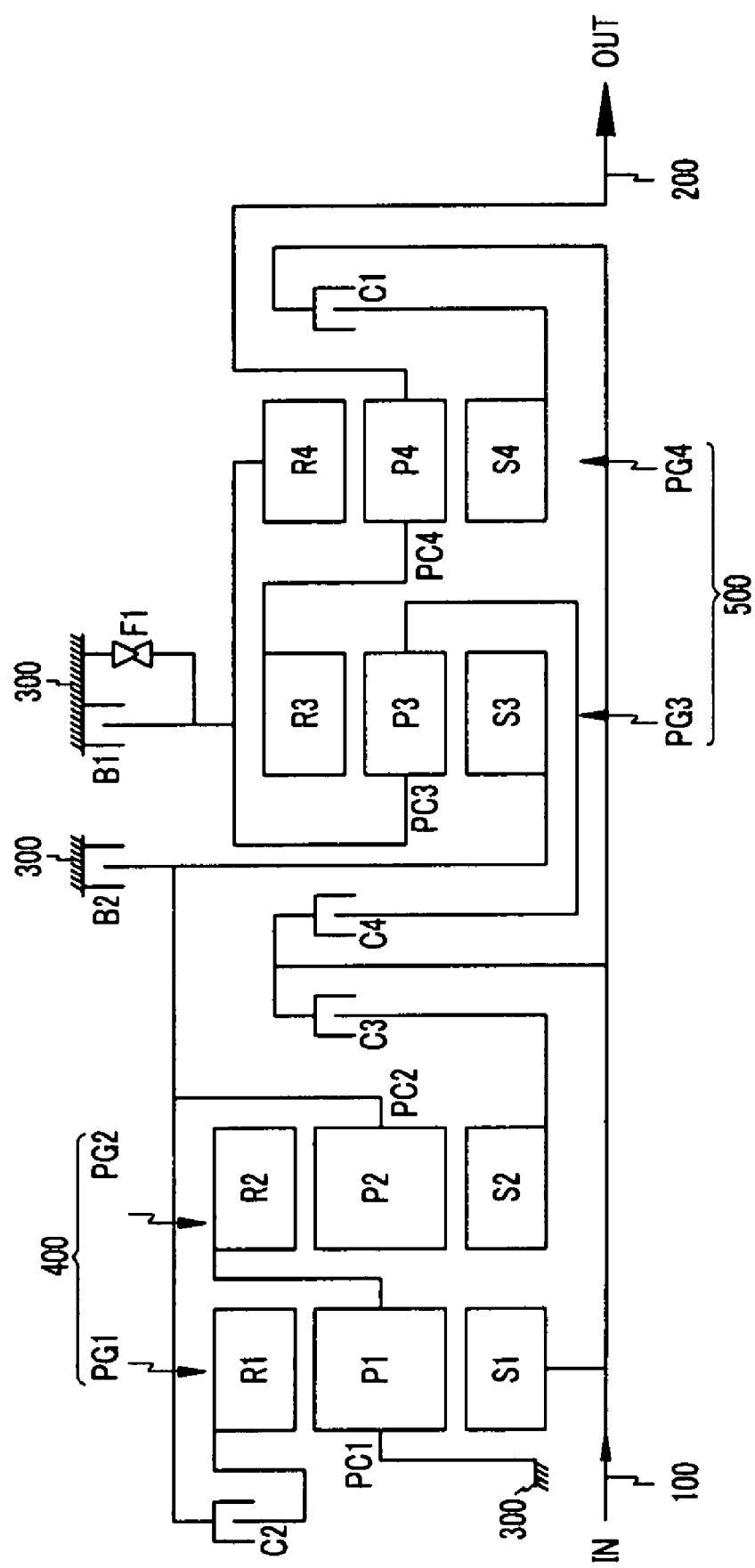
FIG. 5 is a schematic diagram of a power train of an automatic transmission according to the third exemplary embodiment of the present invention.
Figure 6:
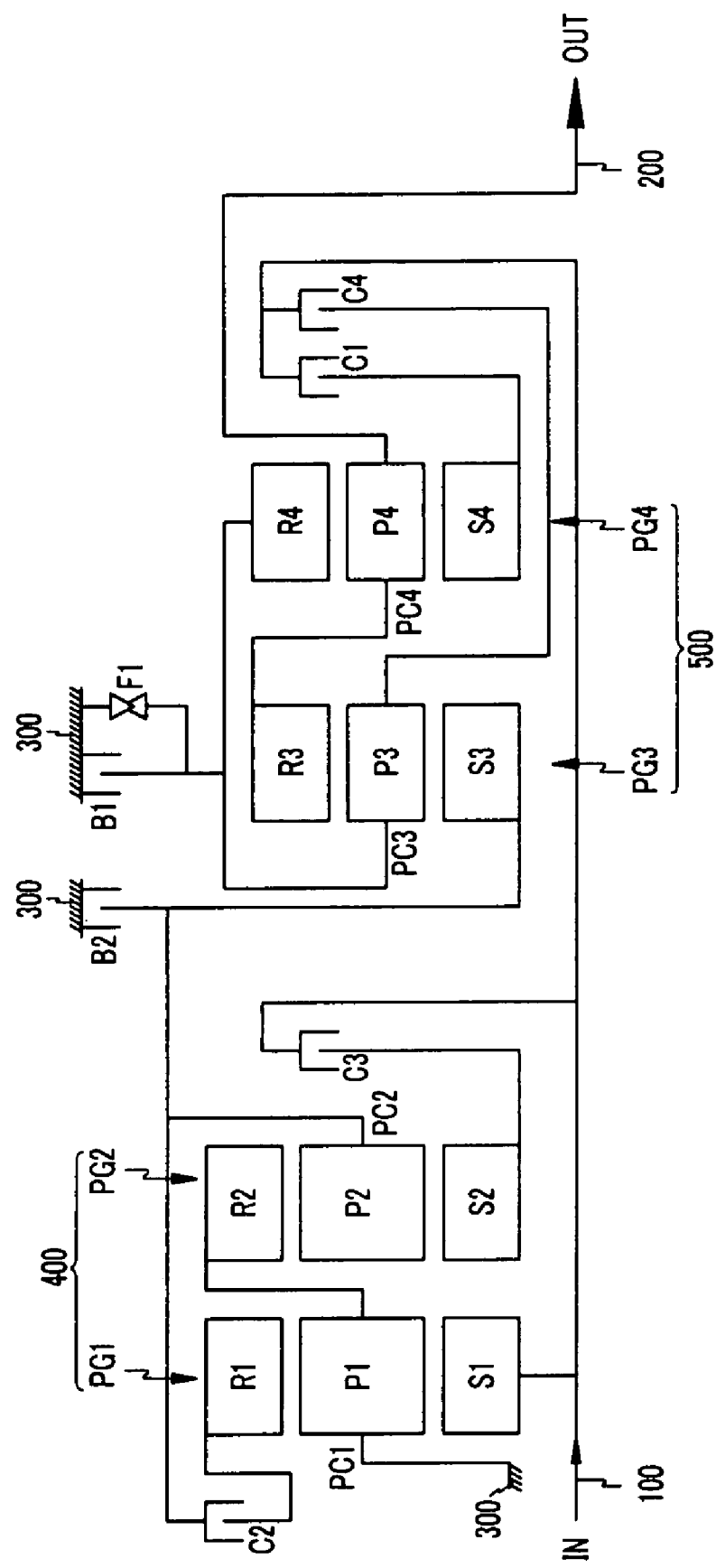
FIG. 6 is a schematic diagram of a power train of an automatic transmission according to the fourth exemplary embodiment of the present invention.
Figure 9:
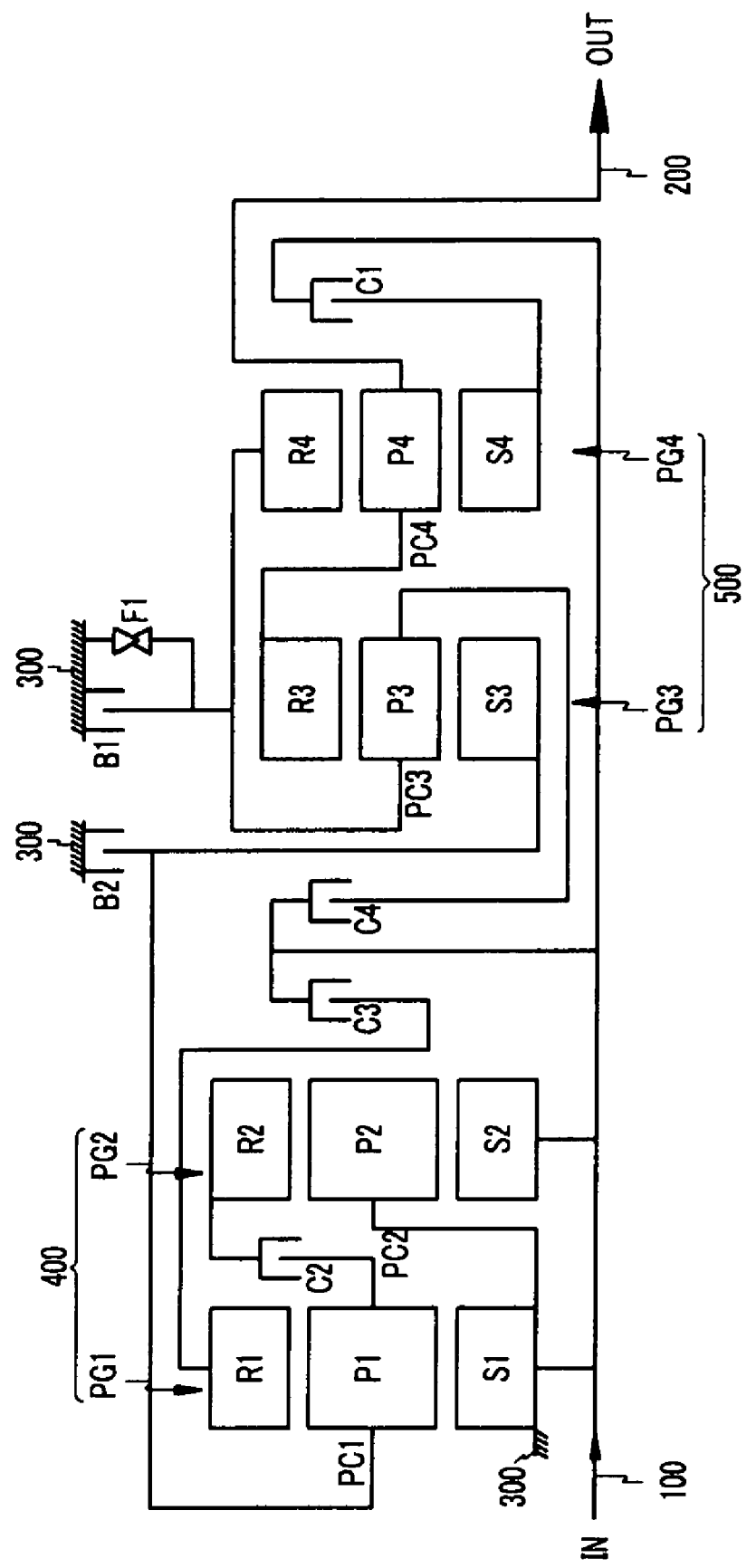
FIG. 9 is a schematic diagram of a power train of an automatic transmission according to the fifth exemplary embodiment of the present invention.
Figure 10:
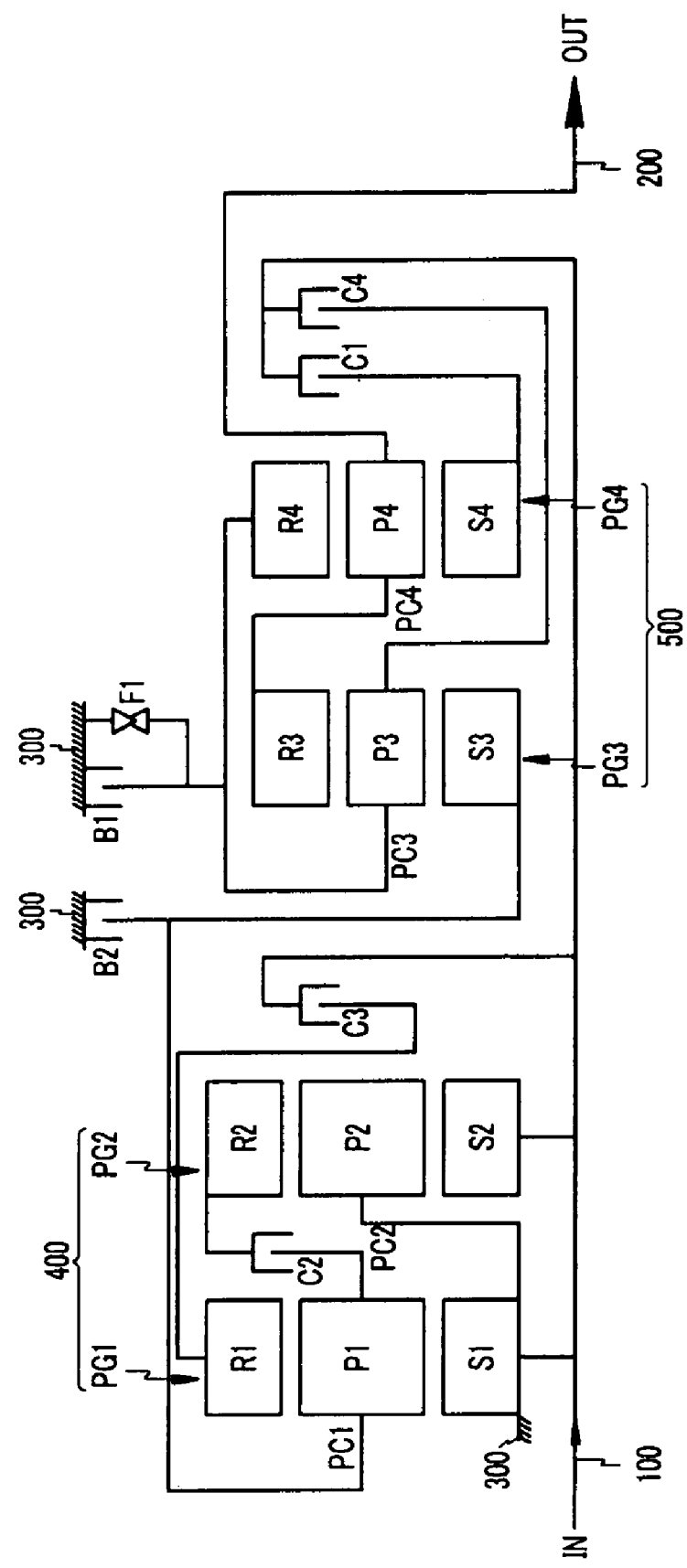
FIG. 10 is a schematic diagram of a power train of an automatic transmission according to the sixth exemplary embodiment of the present invention.

FIG. 1 and FIG. 2 are schematic diagrams of power trains according to the first and second exemplary embodiments of the present invention, FIG. 5 and FIG. 6 are schematic diagrams of power trains according to the third and fourth exemplary embodiments of the present invention, and FIG. 9 and FIG. 10 are schematic diagram of power trains according to the fifth and sixth exemplary embodiments of the present invention.

As shown in FIGS. 1, 2, 5, 6, 9, and 10, exemplary power trains of an automatic transmission according to embodiments of the present invention include an input shaft 100, an output gear 200, a transmission case 300, a speed shift unit 400, and an output unit 500.

The input shaft 100 receives torque from an engine (not shown).

The output gear 200 transmits torque from the power train.

The speed shift unit 400 includes first, second, third, fourth, and fifth operational members. The speed shift unit 400 generates a reverse rotational speed, a rotating direction of which is opposite to a rotating direction of the input shaft 100, at the fourth operational member by operations of the first and third operational members. The speed shift unit 400 also generates a reduced rotational speed that is slower than a rotational speed of the input shaft 100 at the fifth operational member by operations of the second and third operational members.

The output unit 500 includes sixth, seventh, eighth, and ninth operational members. The output unit 500 generates eight forward speeds and one reverse speed at the ninth operational member by operations of the sixth, seventh, and eighth operational members.

In addition, exemplary power trains of an automatic transmission according to the embodiments of the present invention include first, second, third, and fourth clutches C1, C2, C3, and C4 and first and second brakes B1 and B2.

The first operational member is fixedly connected to the input shaft 100 and always acts as an input member.

The second operational member is selectively coupled to the input shaft 100 via the third clutch C3.

Figure 3:
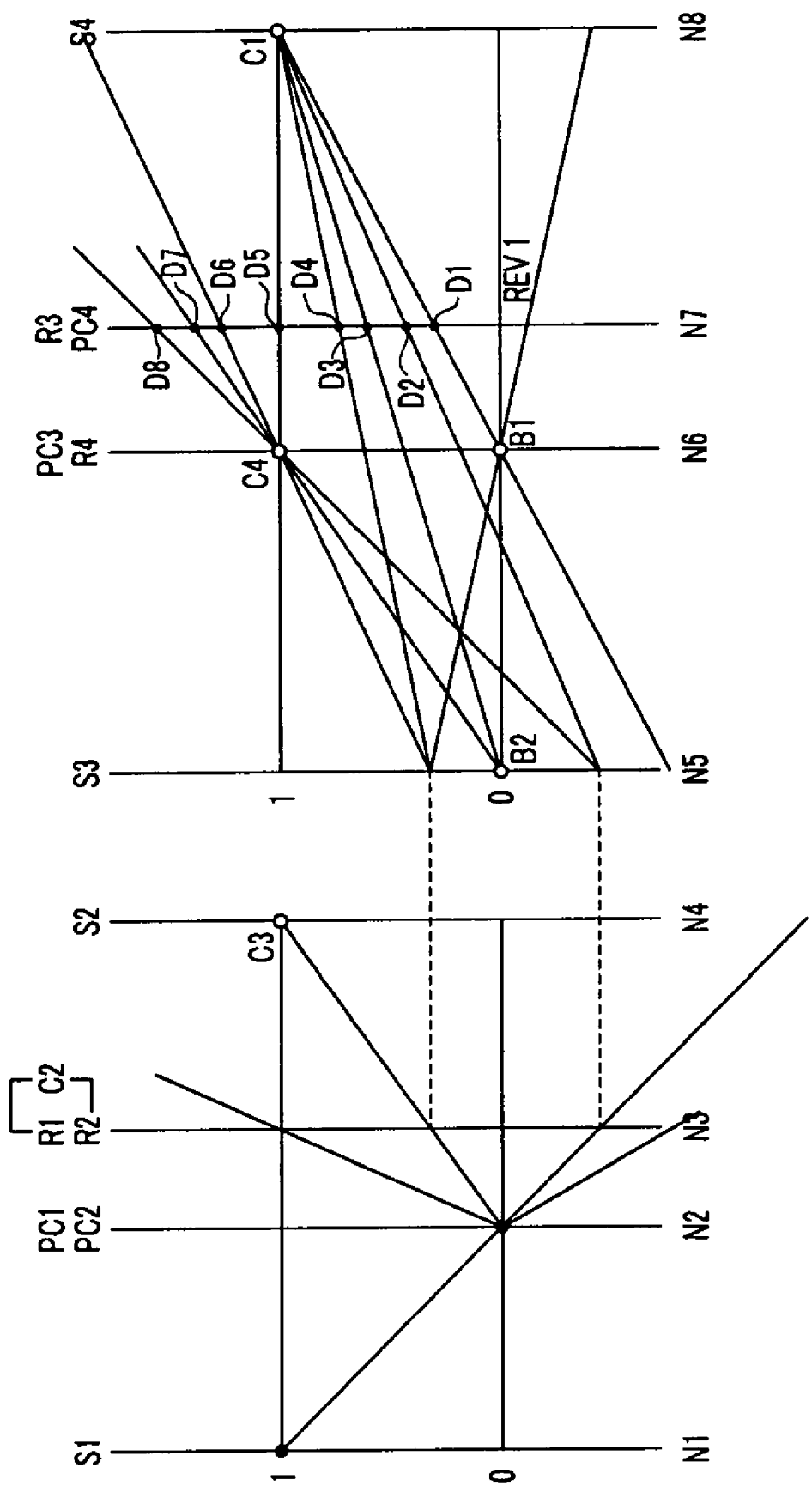
FIG. 3 is a lever diagram showing shifting processes from a first forward speed to an eighth forward speed and one reverse speed in a power train of an automatic transmission according to the first and second exemplary embodiments of the present invention.
Figure 7:
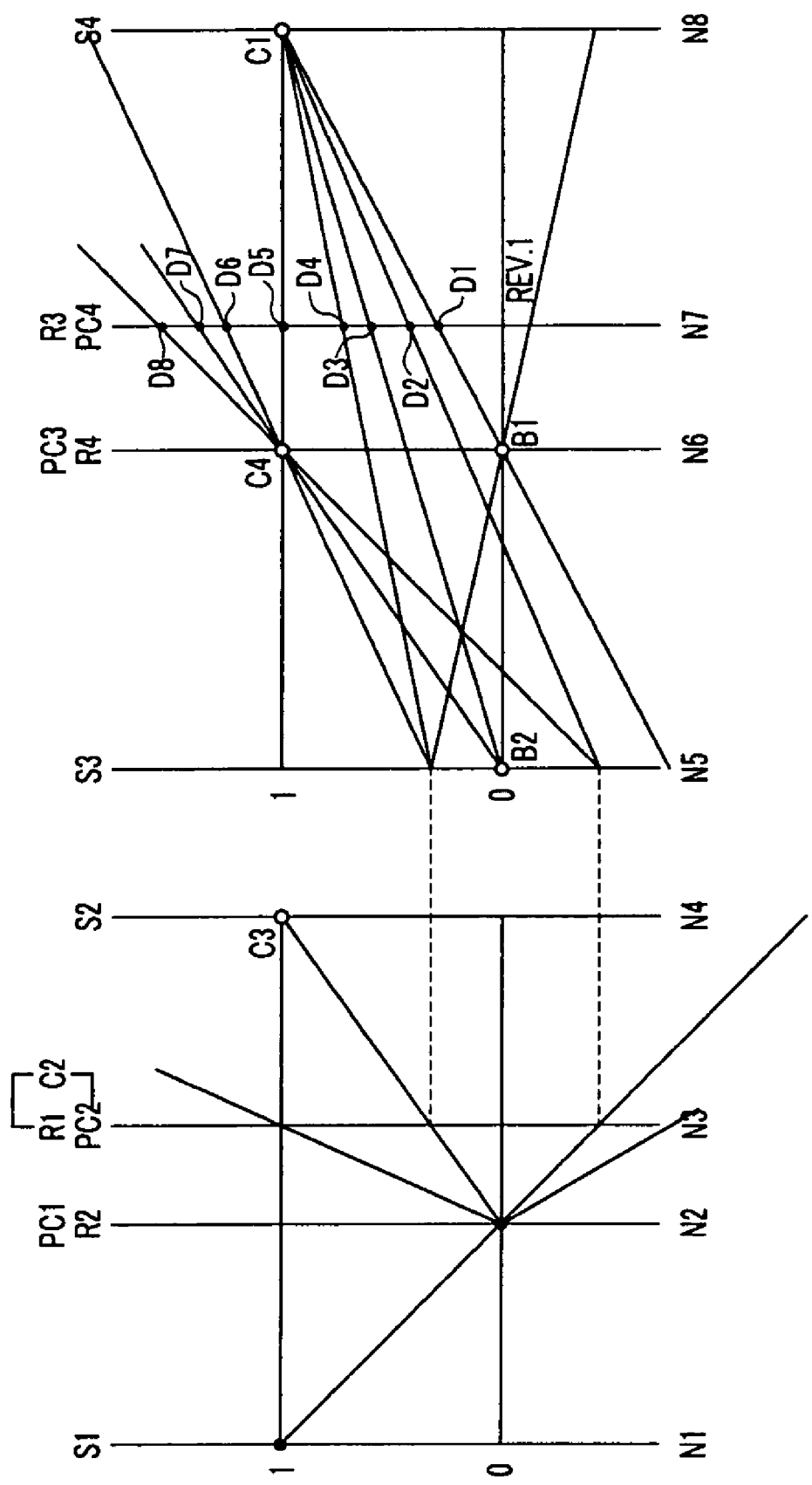
FIG. 7 is a lever diagram showing shifting processes from a first forward speed to an eighth forward speed and one reverse speed in a power train of an automatic transmission according to the third and fourth exemplary embodiments of the present invention.
Figure 11:
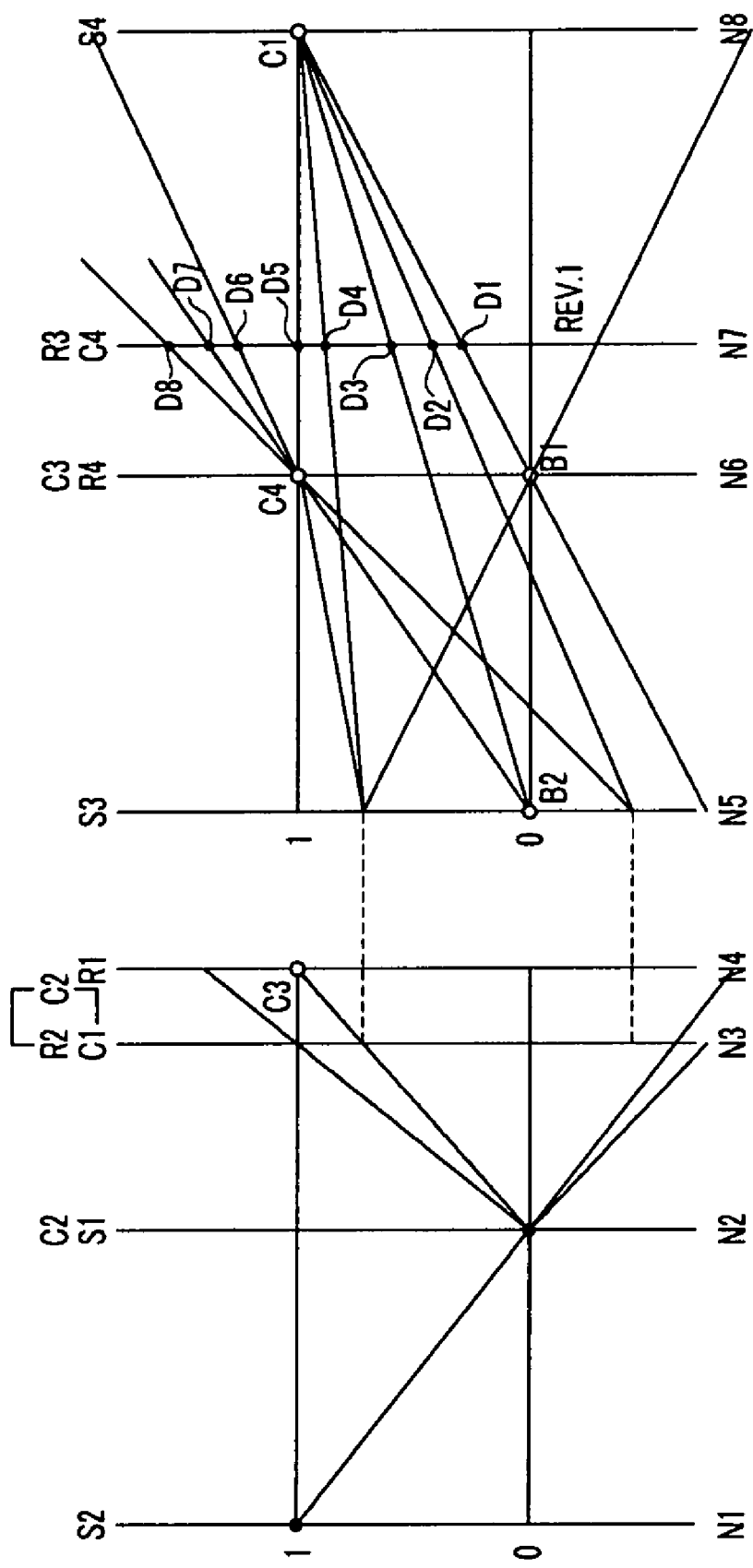
FIG. 11 is a lever diagram showing shifting processes from a first forward speed to an eighth forward speed and one reverse speed in a power train of an automatic transmission according to the fifth and sixth exemplary embodiments of the present invention.

The third operational member is fixedly connected to the transmission case 300 and is always stopped. Therefore, as shown in FIG. 3, FIG. 7, and FIG. 11, the reverse rotational speed is generated at the fourth operational member by the operations of the first and third operational members.

The fifth operational member is selectively coupled to the fourth operational member via the second clutch C2 and selectively receives the reverse rotational speed from the fourth operational member. In addition, as shown in FIG. 3, FIG. 7, and FIG. 11, the reduced rotational speed is generated at the fifth operational member by the operations of the second and third operational members.

The sixth operational member is fixedly connected to the fifth operational member and receives the reverse rotational speed from the fourth operational member or or the reduced rotational speed from the fifth operational member selectively via clutch C2 or C3. In addition, the sixth operational member is selectively coupled to the transmission case 300 via the second brake B2 and is selectively stopped.

The seventh operational member is selectively coupled to the input shaft 100 via the fourth clutch C4. In addition, the seventh operational member is selectively coupled to the transmission case 300 via the first brake B1 and is selectively stopped. A one-way clutch F1, being disposed in parallel with the first brake B1 is interposed between the seventh operational member and the transmission case 300.

The eighth operational member is selectively coupled to the input shaft 100 via the first clutch C1.

The ninth operational member is fixedly connected to the output gear 200 and always acts as an output member.

Hereinafter, referring to FIG. 1, the exemplary power train of an automatic transmission according to the first embodiment of the present invention will be described in detail.

As shown in FIG. 1, according to the first exemplary embodiment of the present invention, the speed shift unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof. A first pinion gear P1, being engaged with the first ring gear R1 and the first sun gear S1, is connected to and carried by the first planet carrier PC1.

The second planetary gear set PG2 is a double pinion planetary gear set, and includes a second sun gear S2, a second planet carrier PC2, and a second ring gear R2 as operational members thereof. A second pinion gear P2, being engaged with the second ring gear R2 and the second sun gear S2, is connected to and carried by the second planet carrier PC2.

The third planetary gear set PG3 is a single pinion planetary gear set and includes a third sun gear S3, a third planet carrier PC3, and a third ring gear R3 as operational members thereof. A third pinion gear P3, being engaged with the third ring gear R3 and the third sun gear S3, is connected to and carried by the third planet carrier PC3.

The fourth planetary gear set PG4 is a single pinion planetary gear set and includes a fourth sun gear S4, a fourth planet carrier PC4, and a fourth ring gear R4 as operational members thereof. A fourth pinion gear P4, being engaged with the fourth ring gear R4 and the fourth sun gear S4, is connected to and carried by the fourth planet carrier PC4.

According to the first exemplary embodiment of the present invention, the first planet carrier PC1 is fixedly connected to the second planet carrier PC2. The first sun gear S1 is operated as the first operational member, the second sun gear S2 is operated as the second operational member, at least one of the fixedly connected first planet carrier PC1 and second planet carrier PC2 is operated as the third operational member, the first ring gear R1 is operated as the fourth operational member, and the second ring gear R2 is operated as the fifth operational member.

The third ring gear R3 is fixedly connected to the fourth planet carrier PC4, and the third planet carrier PC3 is fixedly connected to the fourth ring gear R4. The third sun gear S3 is operated as the sixth operational member, at least one of the fixedly connected third planet carrier PC3 and fourth ring gear R4 is operated as the seventh operational member, the fourth sun gear S4 is operated as the eighth operational member, and at least one of the fixedly connected third ring gear R3 and fourth planet carrier PC4 is operated as the ninth operational member.

The first clutch C1 is disposed at an opposite side to the speed shift unit 400 with reference to the output unit 500, the second clutch C2 is disposed at an opposite side to the output unit 500 with reference to the speed shift unit 400, and the third clutch C3 is disposed between the speed shift unit 400 and the output unit 500.

The fourth clutch C4 is disposed between the speed shift unit 400 and the output unit 500.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, operations of a power train according to the first exemplary embodiment of the present invention will be described in detail.

FIG. 4 is an operational chart for a power train of an automatic transmission that realizes eight forward speeds and one reverse speed according to the first and second exemplary embodiments of the present invention.

As shown in FIG. 4, according to the first exemplary embodiment of the present invention, the first clutch C1 and the first brake B1 or the one-way clutch F1 are applied in a first forward speed D1, the first and second clutches C1 and C2 are applied in a second forward speed D2, the first clutch C1 and the second brake B2 are applied in a third forward speed D3, the first and third clutches C1 and C3 are applied in a fourth forward speed D4, the first and fourth clutches C1 and C4 are applied in a fifth forward speed D5, the third and fourth clutches C3 and C4 are applied in a sixth forward speed D6, the fourth clutch C4 and the second brake B2 are applied in a seventh forward speed D7, and the second and fourth clutches C2 and C4 are applied in an eighth forward speed D8.

In addition, the third clutch C3 and the first brake B1 are applied in a reverse speed REV. 1.

Hereinafter, up-shifting processes of the exemplary power train according to the first exemplary embodiment of the present invention will be described in detail.

In a shifting process form the first forward speed D1 to the second forward speed D2, the first brake B1 is released and the second clutch C2 is applied.

In a shifting process form the second forward speed D2 to the third forward speed D3, the second clutch C2 is released and the second brake B2 is applied.

In a shifting process form the third forward speed D3 to the fourth forward speed D4, the second brake B2 is released and the third clutch C3 is applied In a shifting process form the fourth forward speed D4 to the fifth forward speed D5, the third clutch C3 is released and the fourth clutch C4 is applied.

In a shifting process form the fifth forward speed D5 to the sixth forward speed D6, the first clutch C1 is released and the third clutch C3 is applied.

In a shifting process form the sixth forward speed D6 to the seventh forward speed D7, the third clutch C3 is released and the second brake B2 is applied.

In a shifting process form the seventh forward speed D7 to the eighth forward speed D8, the second brake B2 is released and the second clutch C2 is applied.

Down-shifting processes are reverse processes of the up-shifting processes for the first exemplary embodiment of the present invention.

Hereinafter, skip down-shifting processes for the first exemplary embodiment of the present invention will be described in detail.

In a skip down-shifting from the third forward speed D3 to the first forward speed D1, the second brake B2 is released and the first brake B1 is applied.

In a skip down-shifting from the fourth forward speed D4 to the second forward speed D2, the third clutch C3 is released and the second clutch C2 is applied.

In a skip down-shifting from the fourth forward speed D4 to the first forward speed D1, the third clutch C3 is released and the first brake B1 is applied.

In a skip down-shifting from the fifth forward speed D5 to the third forward speed D3, the fourth clutch C4 is released and the second brake B2 is applied.

In a skip down-shifting from the fifth forward speed D5 to the second forward speed D2, the fourth clutch C4 is released and the second clutch C2 is applied.

In a skip down-shifting from the sixth forward speed D6 to the fourth forward speed D4, the fourth clutch C4 is released and the first clutch C1 is applied.

In a skip down-shifting from the sixth forward speed D6 to the third forward speed D3, 6→5 down-shifting and 5→3 down-shifting may be performed in sequence or 6→4 down-shifting 4→3 down-shifting may be performed in sequence.

In a skip down-shifting from the sixth forward speed D6 to the second forward speed D2, 6→4 down-shifting and 4→2 down-shifting may be performed in sequence or 6→5 down-shifting and 5→2 down-shifting may be performed in sequence.

In a skip down-shifting from the seventh forward speed D7 to the fifth forward speed D5, the second brake B2 is released and the first clutch C1 is applied.

In a skip down-shifting from the seventh forward speed D7 to the fourth forward speed D4, 7→6 down-shifting and 6→4 down-shifting may be performed in sequence or 7→5 down-shifting and 5→4 down-shifting may be performed in sequence.

In a skip down-shifting from the seventh forward speed D7 to the third forward speed D3, the fourth clutch C4 is released and the first clutch C1 is applied.

In a skip down-shifting from the seventh forward speed D7 to the second forward speed D2, 7→5 down-shifting and 5→2 down-shifting may be performed in sequence or 7→3 down-shifting and 3→2 down-shifting may be performed in sequence.

In a skip down-shifting from the eighth forward speed D8 to the sixth forward speed D6, the second clutch C2 is released and the third clutch C3 is applied.

In a skip down-shifting from the eighth forward speed D8 to the fifth forward speed D5, the second clutch C2 is released and the first clutch C1 is applied.

In a skip down-shifting from the eighth forward speed D8 to the fourth forward speed D4, 8→5 down-shifting and 5→4 down-shifting may be performed in sequence or 8→6 down-shifting and 6→4 down-shifting may be performed in sequence.

In a skip down-shifting from the eighth forward speed D8 to the third forward speed D3, 8→5 down-shifting and 5→3 down-shifting are performed in sequence.

In a skip down-shifting from the eighth forward speed D8 to the second forward speed D2, the fourth clutch C4 is released and the first clutch C1 is applied or 8→5 down-shifting and 5→2 down-shifting are performed in sequence.

Skip up-shifting processes are reverse processes of the skip down-shifting processes according to the first exemplary embodiment of the present invention.

FIG. 3 is a lever diagram showing shifting processes from a first forward speed to an eighth forward speed in a power train of an automatic transmission according to the first and second exemplary embodiments of the present invention.

As shown in FIG. 3, the power train of an automatic transmission according to the first exemplary embodiment of the present invention includes three single pinion planetary gear sets and one double pinion planetary gear set. In addition, the first planet carrier PC1 is fixedly connected to the second planet carrier PC2, the third planet carrier PC3 is fixedly connected to the fourth ring gear R4, and the third ring gear R3 is fixedly connected to the fourth planet carrier PC4. Therefore, operational members of the exemplary power train according to the first embodiment of the present invention are represented as nine nodes in the lever diagram. However, since the first ring gear R1 is selectively coupled to the second ring gear R2 via the second clutch C2, the operational members of the exemplary power train according to the first embodiment of, the present invention may be represented as eight nodes for convenience.

Accordingly, the first sun gear S1 is set to a first node N1, the first planet carrier PC1 and the second planet carrier PC2 are set to a second node N2, the first ring gear R1 and the second ring gear R2 are set to a third node N3, the second sun gear S2 is set to a fourth node N4, the third sun gear S3 is set to a fifth node N5, the third planet carrier PC3 and the fourth ring gear R4 are set to a sixth node N6, the third ring gear R3 and the fourth planet carrier PC4 are set to a seventh node N7, and the fourth sun gear S4 is set to an eighth node N8.

As described above, the first sun gear S1 is fixedly connected to the input shaft 100, and accordingly, the first node N1 rotates with the same rotational speed as the input shaft 100.

In addition, at least one of the fixedly connected first planet carrier PC1 and second planet carrier PC2 is fixedly connected to the transmission case 300, and accordingly, the second node N2 is always stopped.

Therefore, the reverse rotational speed, the rotating direction of which is opposite to the rotating direction of the input shaft 100, is generated at the first ring gear R1 by the operations of the first sun gear S1 and the first planet carrier PC1, and in the case that the second clutch C2 is applied, the reverse rotational speed is transmitted to the third node N3 of the second ring gear R2.

In addition, the second sun gear S2 is selectively coupled to the input shaft 100 via the third clutch C3, and accordingly, the fourth node N4 rotates with the same rotational speed as the input shaft 100 by an coupling operation of the third clutch C3.

Therefore, a reduced rotational speed that is slower than the rotational speed of the input shaft 100 is generated at the third node N3 of the second ring gear R2 by the engagements of the second planet carrier PC2 and the second sun gear S2.

In addition, the third sun gear S3 is fixedly connected to the second ring gear R2. Therefore, the fifth node N5 receives the reverse rotational speed from the first ring gear R1 or the reduced rotational speed from the third node N3. In addition, the third sun gear S3 is selectively coupled to the transmission case 300 via the second brake B2, and accordingly, the fifth node N5 is stopped by an application of the second brake B2.

At least one of the fixedly connected third planet carrier PC3 and fourth ring gear R4 is selectively coupled to the input shaft 100 via the fourth clutch C4 and selectively coupled to the transmission case 300 via, the first brake B1. Therefore, the sixth node N6 rotates with the same rotational speed as the input shaft 100 by an application of the fourth clutch C4 and is stopped by an application of the first brake B1.

The fourth sun gear S4 is selectively coupled to the input shaft 100 via the first clutch C1, and accordingly, the eighth node N8 rotates with the same rotational speed as the input shaft 100 by an application of the first clutch C1.

In addition, at least one of the fixedly connected third ring gear R3 and fourth planet carrier PC4 is fixedly connected to the output gear 200. Therefore, the seventh node N7 delivers to the output gear 200 each shift speed that is generated by operations of the speed shift unit 400 and the output unit 500.

Hereinafter, formation of each shift speed by the power train of an automatic transmission according to the first exemplary embodiment of the present invention will be described in detail, with reference to FIG. 3.

In the first forward speed D1, the eighth node N8 rotates with the same rotational speed as the input shaft 100 by the application of the first clutch C1, and the sixth node N6 is stopped by the application of the first brake B1. Therefore, the first forward speed D1 is achieved at the seventh node N7.

In the second forward speed D2, the reverse rotational speed is transmitted to the third node N3 by the application of the second clutch C2, and then, is transmitted to the fifth node N5 fixedly connected to the third node N3. In addition, the eighth node N8 rotates with the same rotational speed as the input shaft 100 by the application of the first clutch C1. Therefore, the second forward speed D2 is achieved at the seventh node N7.

In the third forward speed D3, the eighth node N8 rotates with the same rotational speed as the input shaft 100 by the application of the first clutch C1, and the fifth node N5 is stopped by the application of the second brake B2. Therefore, the third forward speed D3 is achieved at the seventh node N7.

In the fourth forward speed D4, the reduced rotational speed is generated at the third node N3 by the application of the third clutch C3, and then, is transmitted to the fifth node N5 fixedly connected to the third node N3. In addition, the eighth node N8 rotates with the same rotational speed as the input shaft 100 by the application of the first clutch C1. Therefore, the fourth forward speed D4 is achieved at the seventh node N7.

In the fifth forward speed D5, the eighth node N8 rotates with the same rotational speed as the input shaft 100 by the application of the first clutch C1, and the sixth node N6 also rotates with the same rotational speed as the input shaft 100 by the application of the fourth clutch C4. Therefore, the fifth forward speed D5 is achieved at the seventh node N7.

In the sixth forward speed D6, the reduced rotational speed is generated at the third node N3 by the application of the third clutch C3, and then, is transmitted to the fifth node N5 fixedly connected to the third node N3. In addition, the sixth node N6 rotates with the same rotational speed as the input shaft 100 by the application of the fourth clutch C4. Therefore, the sixth forward speed D6 is achieved at the seventh node N7.

In the seventh forward speed D7, the sixth node N6 rotates with the same rotational speed as the input shaft 100 by the application of the fourth clutch C4, and the fifth node N5 is stopped by the application of the second brake B2. Therefore, the seventh forward speed D7 is achieved at the seventh node N7.

In the eighth forward speed D8, the reverse rotational speed is transmitted to the third node N3 by the application of the second clutch C2, and then, is transmitted to the fifth node N5 fixedly connected to the third node N3. In addition, the sixth node N6 rotates with the same rotational speed as the input shaft 100 by the application of the fourth clutch C4. Therefore, the eighth forward speed D8 is achieved at the seventh node N7.

In the reverse speed REV. 1, the reduced rotational speed is generated at the third node N3 by the application of the third clutch C3, and then, is transmitted to the fifth node N5 fixedly connected to the third node N3. In addition, the sixth node N6 is stopped by the application of the first brake B1. Therefore, the reverse speed REV. 1 is achieved at the seventh node N7.

As shown in FIG. 2, the power train of an automatic transmission according to the second exemplary embodiment of the present invention is the same as the power train of an automatic transmission according to the first exemplary embodiment of the present invention except for the position of the fourth clutch C4. Therefore, a detailed description thereof will be omitted.

The fourth clutch C4 is disposed at an opposite side to the speed shift unit 400 with reference to the output unit 500 according to the second exemplary embodiment of the present invention.

Hereinafter, referring to FIG. 5, the power train of an automatic transmission according to the third exemplary embodiment of the present invention will be described in detail.

As shown in FIG. 5, according to the third exemplary embodiment of the present invention, the speed shift unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set and includes a third sun gear S3, a third planet carrier PC3, and a third ring gear R3 as operational members thereof.

The fourth planetary gear set PG4 is a single pinion planetary gear set and includes a fourth sun gear S4, a fourth planet carrier PC4, and a fourth ring gear R4 as operational members thereof.

According to the third exemplary embodiment of the present invention, the first planet carrier PC1 is fixedly connected to the second ring gear R2. The first sun gear S1 is operated as the first operational member, the second sun gear S2 is operated as the second operational member, at least one of the fixedly connected first planet carrier PC1 and second ring gear R2 is operated as the third operational member, the first ring gear R1 is operated as the fourth operational member, and the second planet carrier PC2 is operated as the fifth operational member.

The third ring gear R3 is fixedly connected to the fourth planet carrier PC4 and the third planet carrier PC3 is fixedly connected to the fourth ring gear R4. The third sun gear S3 is operated as the sixth operational member, at least one of the fixedly connected third planet carrier PC3 and fourth ring gear R4 is operated as the seventh operational member, the fourth sun gear S4 is operated as the eighth operational member, and at least one of the fixedly connected third ring gear R3 and fourth planet carrier PC4 is operated as the ninth operational member.

The first clutch C1 is disposed at an opposite side to the speed shift unit 400 with reference to the output unit 500, the second clutch C2 is disposed at an opposite side to the output unit 500 with reference to the speed shift unit 400, and the third clutch C3 is disposed between the speed shift unit 400 and the output unit 500.

The fourth clutch C4 is disposed between the speed shift unit 400 and the output unit 500.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Operation, shifting processes, and formation of each speed of the power train according to the third exemplary embodiment of the present invention are similar to those of the power train according to the first embodiment of the present invention, and may be easily obtained by a person skilled in the art based on the teachings herein. Thus, a detailed explanation thereof will be omitted.

As shown in FIG. 6, the power train of an automatic transmission according to the fourth exemplary embodiment of the present invention is the same as the power train of an automatic transmission according to the third exemplary embodiment of the present invention, except for a position of the fourth clutch C4. Therefore, a detailed description thereof will be omitted.

The fourth clutch C4 is disposed at an opposite side to the speed shift unit 400 with reference to the output unit 500 according to the fourth exemplary embodiment of the present invention.

Hereinafter, referring to FIG. 9, the power train of an automatic transmission according to the fifth exemplary embodiment of the present invention will be described in detail.

As shown in FIG. 9, according to the fifth exemplary embodiment of the present invention, the speed shift unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set and includes a third sun gear S3, a third planet carrier PC3, and a third ring gear R3 as operational members thereof.

The fourth planetary gear set PG4 is a single pinion planetary gear set and includes a fourth sun gear S4, a fourth planet carrier PC4, and a fourth ring gear R4 as operational members thereof.

According to the fifth exemplary embodiment of the present invention, the first sun gear S1 is fixedly connected to the second planet carrier PC2. The second sun gear S2 is operated as the first operational member, the first ring gear R1 is operated as the second operational member, at least one of the fixedly connected first sun gear S1 and second planet carrier PC2 is operated as the third operational member, the second ring gear R2 is operated as the fourth operational member, and the first planet carrier PC1 is operated as the fifth operational member.

The third ring gear R3 is fixedly connected to the fourth planet carrier PC4, and the third planet carrier PC3 is fixedly connected to the fourth ring gear R4. The third sun gear S3 is operated as the sixth operational member, at least one of the fixedly connected third planet carrier PC3 and fourth ring gear R4 is operated as the seventh operational member, the fourth sun gear S4 is operated as the eighth operational member, and at least one of the fixedly connected third ring gear R3 and fourth planet carrier PC4 is operated as the ninth operational member.

The first clutch C1 is disposed at an opposite side to the speed shift unit 400 with reference to the output unit 500, the second clutch C2 is disposed at an opposite side to the output unit 500 and between the planetary gears PG1 and PG2 of the speed shift unit 400, and the third clutch C3 is disposed between the speed shift unit 400 and the output unit 500.

The fourth clutch C4 is disposed between the speed shift unit 400 and the output unit 500.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Operation, shifting processes, and formation of each speed of the power train according to the fifth exemplary embodiment of the present invention are similar to those of the power train according to the first embodiment of the present invention, and may be easily obtained by a person skilled in the art based on the teachings herein. Thus, a detailed explanation thereof will be omitted.

As shown in FIG. 10, the power train of an automatic transmission according to the sixth exemplary embodiment of the present invention is the same as the power train of an automatic transmission according to the fifth exemplary embodiment of the present invention, except for a position of the fourth clutch C4. Therefore, a detailed description thereof will be omitted.

The fourth clutch C4 is disposed at an opposite side to the speed shift unit 400 with reference to the output unit 500 according to the sixth exemplary embodiment of the present invention.

According to the exemplary embodiments of the present invention, eight forward speeds and one reverse speed may be realized.

Further, according to the exemplary embodiments of the present invention, skip up-shifting and skip down-shifting may be facilitated by reducing frictional members engaged or released in a skip shifting process.

In addition, according to the exemplary embodiments of the present invention, the length of an automatic transmission may be reduced by effectively arranging clutches and brakes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission, comprising:
    an input shaft;
    an output gear;
    a transmission case;
    a speed shift unit comprising a first operational member that is fixedly connected to the input shaft, a second operational member that is selectively coupled to the input shaft, a third operational member that is fixedly connected to the transmission case, a fourth operational member that generates a reverse rotational speed by operations of the first and third operational members, and a fifth operational member that is selectively coupled to the fourth operational member and receives the reverse rotational speed from the fourth operational member, or generates a reduced rotational speed by operations of the second and third operational members;
    an output unit comprising a sixth operational member that is fixedly connected to the fifth operational member, selectively receives the reverse rotational speed from the fourth operational member or the reduced rotational speed from the fifth operational member, and is selectively coupled to the transmission case, a seventh operational member that is selectively coupled to the input shaft and selectively coupled to the transmission case, an eighth operational member that is selectively coupled to the input shaft, and a ninth operational member that always operates as an output member by being fixedly connected to the output gear, wherein the output unit generates eight forward speeds and one reverse speed at the ninth operational member by operations of the sixth, seventh, and eighth operational members;
    a first clutch for selectively coupling the eighth operational member to the input shaft;
    a second clutch for selectively coupling the fourth operational member to the fifth operational member;
    a third clutch for selectively coupling the second operational member to the input shaft;
    a fourth clutch for selectively coupling the seventh operational member to the input shaft;
    a first brake for selectively stopping the seventh operational member; and
    a second brake for selectively stopping the sixth operational member.

2. The power train of claim 1, wherein the speed shift unit coupled to the output unit, comprises:
    a first planetary gear set being a single pinion planetary gear set and having a first sun gear, a first planet carrier, and a first ring gear as operational members thereof; and
    a second planetary gear set being a double pinion planetary gear set and having a second sun gear, a second planet carrier, and a second ring gear as operational members thereof,
    wherein the first planet carrier is fixedly connected to the second planet carrier,
    the first sun gear is operated as the first operational member,
    the second sun gear is operated as the second operational member,
    at least one of the fixedly connected first planet carrier and second planet carrier is operated as the third operational member,
    the first ring gear is operated as the fourth operational member, and
    the second ring gear is operated as the fifth operational member.

3. The power train of claim 2, wherein the output unit comprises:
- a third planetary gear set being a single pinion planetary gear set and having a third sun gear, a third planet carrier, and a third ring gear as operational members thereof; and
- a fourth planetary gear set being a single pinion planetary gear set and having a fourth sun gear, a fourth planet carrier, and a fourth ring gear as operational members thereof,
- wherein the third ring gear is fixedly connected to the fourth planet carrier,
- the third planet carrier is fixedly connected to the fourth ring gear,
- the third sun gear is operated as the sixth operational member,
- at least one of the fixedly connected third planet carrier and fourth ring gear is operated as the seventh operational member,
- the fourth sun gear is operated as the eighth operational member, and
- at least one of the fixedly connected third ring gear and fourth planet carrier is operated as the ninth operational member.

4. The power train of claim 3, wherein the first clutch is disposed at an opposite side to the speed shift unit with reference to the output unit, the second clutch is disposed at an opposite side to the output unit with reference to the speed shift unit, and the third clutch is disposed between the speed shift unit and the output unit.

5. The power train of claim 4, wherein the fourth clutch is disposed between the speed shift unit and the output unit.

6. The power train of claim 4, wherein the fourth clutch is disposed at an opposite side to the speed shift unit with reference to the output unit.

7. The power train of claim 3, wherein a one-way clutch, being disposed in parallel with the first brake, is interposed between the seventh operational member and the transmission case.

8. The power train of claim 4, wherein:
- the first clutch and the first brake are operated in a first forward speed,
- the first and second clutches are operated in a second forward speed,
- the first clutch and the second brake are operated in a third forward speed,
- the first and third clutches are operated in a fourth forward speed,
- the first and fourth clutches are operated in a fifth forward speed,
- the third and fourth clutches are operated in a sixth forward speed,
- the fourth clutch and the second brake are operated in a seventh forward speed,
- the second and fourth clutches are operated in an eighth forward speed, and
- the third clutch and the first brake are operated in a reverse speed.

9. The power train of claim 1, wherein the speed shift unit coupled to the output unit, comprises:
- a first planetary gear set being a single pinion planetary gear set and having a first sun gear, a first planet carrier, and a first ring gear as operational members thereof; and
- a second planetary gear set being a single pinion planetary gear set and having a second sun gear, a second planet carrier, and a second ring gear as operational members thereof,
- wherein the first planet carrier is fixedly connected to the second ring gear,
- the first sun gear is operated as the first operational member,
- the second sun gear is operated as the second operational member,
- at least one of the fixedly connected first planet carrier and second ring gear is operated as the third operational member,
- the first ring gear is operated as the fourth operational member, and
- the second planet carrier is operated as the fifth operational member.

10. The power train of claim 9, wherein the output unit comprises:
- a third planetary gear set being a single pinion planetary gear set and having a third sun gear, a third planet carrier, and a third ring gear as operational members thereof; and
- a fourth planetary gear set being a single pinion planetary gear set and having a fourth sun gear, a fourth planet carrier, and a fourth ring gear as operational members thereof,
- wherein the third ring gear is fixedly connected to the fourth planet carrier,
- the third planet carrier is fixedly connected to the fourth ring gear,
- the third sun gear is operated as the sixth operational member,
- at least one of the fixedly connected third planet carrier and fourth ring gear is operated as the seventh operational member,
- the fourth sun gear is operated as the eighth operational member, and
- at least one of the fixedly connected third ring gear and fourth planet carrier is operated as the ninth operational member.

11. The power train of claim 10, wherein the first clutch is disposed at an opposite side to the speed shift unit with reference to the output unit, the second clutch is disposed at an opposite side to the output unit with reference to the speed shift unit, and the third clutch is disposed between the speed shift unit and the output unit.

12. The power train of claim 11, wherein the fourth clutch is disposed between the speed shift unit and the output unit.

13. The power train of claim 11, wherein the fourth clutch is disposed at an opposite side to the speed shift unit with reference to the output unit.

14. The power train of claim 10, wherein a one-way clutch, being disposed in parallel with the first brake, is interposed between the seventh operational member and the transmission case.

15. The power train of claim 11, wherein:
- the first clutch and the first brake are operated in a first forward speed,
- the first and second clutches are operated in a second forward speed,
- the first clutch and the second brake are operated in a third forward speed,
- the first and third clutches are operated in a fourth forward speed,
- the first and fourth clutches are operated in a fifth forward speed,
- the third and fourth clutches are operated in a sixth forward speed,
- the fourth clutch and the second brake are operated in a seventh forward speed, the second and fourth clutches are operated in an eighth forward speed, and the third clutch and the first brake are operated in a reverse speed.

16. The power train of claim 1, wherein the speed shift unit coupled to the output unit, comprises:

a first planetary gear set being a single pinion planetary gear set and having a first sun gear, a first planet carrier, and a first ring gear as operational members thereof; and a second planetary gear set being a single pinion planetary gear set and having a second sun gear, a second planet carrier, and a second ring gear as operational members thereof, wherein the first sun gear is fixedly connected to the second planet carrier, the second sun gear is operated as the first operational member, the first ring gear is operated as the second operational member, at least one of the fixedly connected first sun gear and second planet carrier is operated as the third operational member, the second ring gear is operated as the fourth operational member, and the first planet carrier is operated as the fifth operational member.

17. The power train of claim 16, wherein the output unit comprises:

a third planetary gear set being a single pinion planetary gear set and having a third sun gear, a third planet carrier, and a third ring gear as operational members thereof; and a fourth planetary gear set being a single pinion planetary gear set and having a fourth sun gear, a fourth planet carrier, and a fourth ring gear as operational members thereof, wherein the third ring gear is fixedly connected to the fourth planet carrier, the third planet carrier is fixedly connected to the fourth ring gear, the third sun gear is operated as the sixth operational member, at least one of the fixedly connected third planet carrier and fourth ring gear is operated as the seventh operational member, the fourth sun gear is operated as the eighth operational member, and at least one of the fixedly connected third ring gear and fourth planet carrier is operated as the ninth operational member.

18. The power train of claim 17, wherein the first clutch is disposed at an opposite side to the speed shift unit with reference to the output unit, the second clutch is disposed at an opposite side to the output unit and between the first planetary gear set and the second planetary gear set of the speed shift unit, and the third clutch is disposed between the speed shift unit and the output unit.

19. The power train of claim 18, wherein the fourth clutch is disposed between the speed shift unit and the output unit.

20. The power train of claim 18, wherein the fourth clutch is disposed at an opposite side to the speed shift unit with reference to the output unit.

21. The power train of claim 17, wherein a one-way clutch, being disposed in parallel with the first brake, is interposed between the seventh operational member and the transmission-case.

22. The power train of claim 18, wherein:

the first clutch and the first brake are operated in a first forward speed, the first and second clutches are operated in a second forward speed, the first clutch and the second brake are operated in a third forward speed, the first and third clutches are operated in a fourth forward speed, the first and fourth clutches are operated in a fifth forward speed, the third and fourth clutches are operated in a sixth forward speed, the fourth clutch and the second brake are operated in a seventh forward speed, the second and fourth clutches are operated in an eighth forward speed, and the third clutch and the first brake are operated in a reverse speed.

* * * * *